June 26, 1951 — M. J. LAVET — 2,558,184
ELECTRICAL EQUIPMENT FOR REMOTE MEASURING AND CONTROLLING
Filed July 17, 1947 — 2 Sheets-Sheet 1
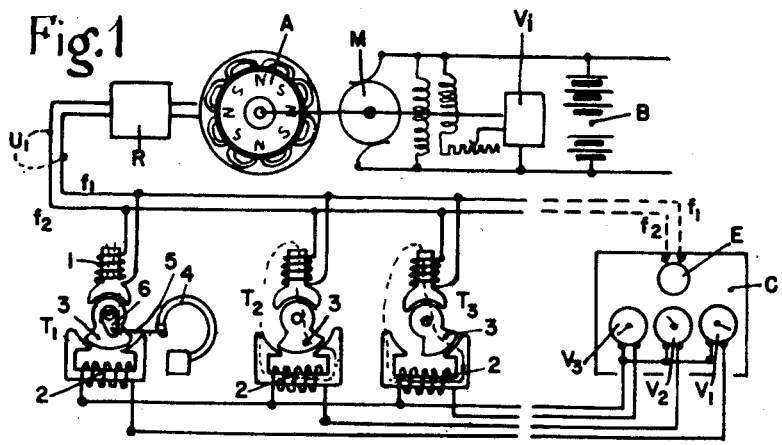
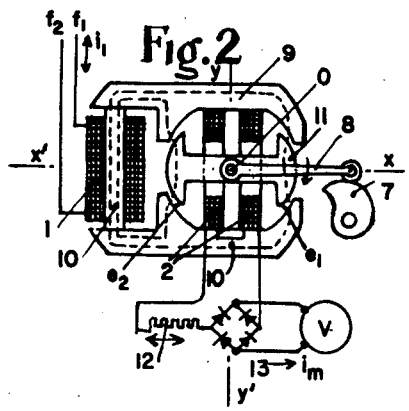
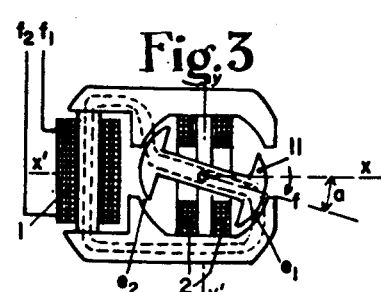
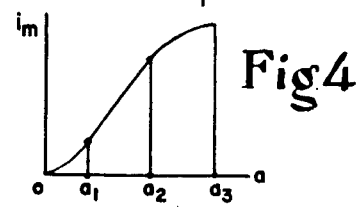
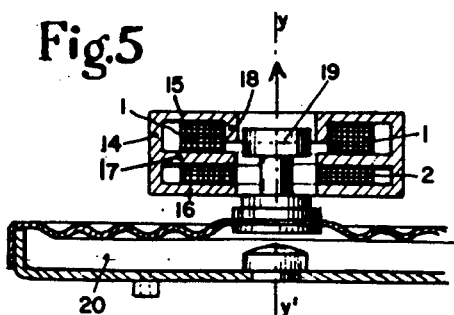
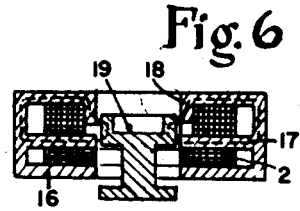
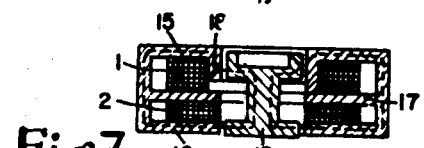
INVENTOR
MARIUS JEAN LAVET
BY
Robert E. Burns
ATTORNEY June 26, 1951      M. J. LAVET      2,558,184
ELECTRICAL EQUIPMENT FOR REMOTE
MEASURING AND CONTROLLING
Filed July 17, 1947      2 Sheets-Sheet 2
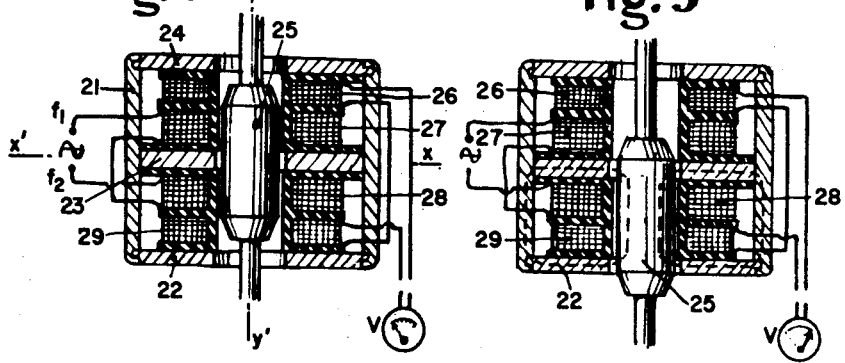
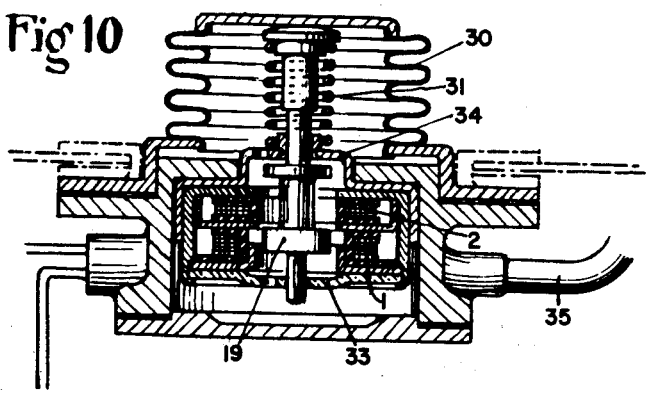
INVENTOR
MARIUS JEAN LAVET
BY
Robert C. Burns
ATTORNEY.

Patented June 26, 1951

2,558,184

UNITED STATES PATENT OFFICE 2,558,184

ELECTRICAL EQUIPMENT FOR REMOTE MEASURING AND CONTROLLING

Marius Jean Lavet, Paris, France

Application July 17, 1947, Serial No. 761,674
In France December 29, 1938

Section 1, Public Law 690, August 8, 1946
Patent expires December 29, 1958

9 Claims. (Cl. 171—119)

The present invention relates to electrical equipments enabling to signal at a distance the displacements of members moving with divers alternating motions. It relates more particularly to equipments for aircrafts, the said equipments being intended for transmitting to the indicating panel boards of the pilot and control compartments the numerous values relating to the measurements and the positions of remote members. For instance, the measuring values indicated relate to pressures, temperatures, speeds, forces, levels, deformations, direction of forces and speeds, etc. Members whose positions must be indicated are undercarriages, ailerons, curvature shutters, valves, taps, any piece which may be deformed, controlling devices for the propeller pitch, etc. The magnitudes of the measuring values to be indicated on the panel boards are translated by the displacements of directing members which are constituted by gauges, dynamometers, floats, weather flags, gyro-compasses, etc. or by short mechanical shafting. Devices have been already proposed for remote measuring of the displacement of these directing members on one hand by means of transmitters which convert the said displacements into variable electric voltages, and on the other hand by means of receivers or indicators constituted by instruments measuring the voltages thus obtained. The main object of this invention is to obtain voltages for electrical measurement and the remote indication of those voltages in an accurate and unfailing manner by means of very simple and rugged small instruments which can be easily adapted on gauges, dynamometers and other directing devices.

The present invention is more particularly concerned with the transmitters of such remote measuring plants.

Transmitters are already known which are built in the form of variable transformers comprising an electromagnetic circuit formed by a stationary part provided with a primary winding fed by an alternating current, and a movable magnetic part linked to the member the displacements of which are to be measured and provided with a secondary winding wherein a voltage is generated of which the value depends upon the position of the movable magnetic part.

(a) One object of the invention is the complete suppression in transmitters of devices with moving electric contacts (such as connections by means of rings and wipers, etc.) which may cause sparking and various troubles due to clogging, wearing, shocks, vibrations, variable forces of friction, etc.

(b) Another object of the invention is to avoid in variable transformers the use of moving windings and flexible connections which are always constituting weak spots and causes of breakdown;

(c) Another object of the invention is to obtain displacements on variable transformers with a minimum friction and much reduced forces so that they can thus be combined with very sensitive directing instruments without disturbing their operation;

(d) Still another object of the invention is to simplify variable transformers so that the same require no maintenance and operate always with a perfect accuracy and absolute safety (this result being most important, as said transformers are usually not easily accesible);

(e) A further object of the invention is to reduce the number of electric wires which ensure connection in order that the supply of the panel boards located in air tight compartments can be made by means of a cable consisting of a small number of conductors, all junctions being simplified and becoming safer.

A further object of the invention is the transmitter carried out in form of a variable transformer which comprises on one hand primary windings supplied by a source of alternating current whose voltage and frequency are kept constant, and on the other hand secondary windings in which variable E. M. F.'s are developed by induction, the said E. M. F.'s depending upon the directing members and being measured at a distance by indicating voltmeters.

With these and other objects in view, the variable transformer according to the invention comprises a magnetic circuit formed on one hand by a fixed part provided with two symmetrically arranged polar pieces and with two air-gaps arranged between said polar pieces and by a fixed primary winding arranged on said fixed magnetic part, and, on the other hand by a movable part controlled by the movable member of which the displacements are to be measured, and by a fixed secondary winding surrounding said movable magnetic part and the axis of which coincides with the axis of symmetry of the two fixed polar pieces, the said movable magnetic part being linked to the member of which the displacements are to be measured in such a manner that when said displacement is nil, said movable magnetic part is symmetrically positioned with respect to the fixed secondary winding and to the two air-gaps.

With these and other objects in view, the variable transformer according to the invention comprises a laminated magnetic circuit formed on one hand by a fixed part provided with two pole pieces arranged to form two air gaps and having two transverse symmetry planes, the one passing symmetrically between the pole pieces, and the other being perpendicular to the first one, a magnetic piece connecting said polar pieces and a stationary primary winding arranged on said connecting piece to generate an electromagnetic flux between said pole pieces, and, on the other hand, by a movable magnetic part controlled by the movable member of which the displacements are to be measured and by a stationary secondary winding surrounding the movable magnetic part and having its axis arranged in the plane passing symmetrically between the pole pieces of the fixed magnetic part, said movable magnetic part being linked to the member of which the displacements are to be measured in such a manner that when said displacement is nil, said movable magnetic part is symmetrically positioned with respect to the said secondary winding and to the two air gaps.

The main feature of the above transmitter is that for the maximum value of displacement, almost the whole of the flux generated by the primary is linked with the secondary and the magnetic circuit is provided only with very small air gaps so that the transformer operates without any material leakage with a good efficiency which permits the use of a high secondary current and makes it possible to avoid resorting to complicated and delicate amplifying devices.

Furthermore the motion of the movable member of the magnetic circuit is an alternating displacement with a small amplitude and is obtained, if need be, by interposing between the said piece and the directing member a transmitting mechanism with a fixed or variable reduction ratio such as gearing, levers, cranks and rods, cams, etc.

The invention will be better understood with reference to the following description illustrated by the attached drawings.

On those drawings:

Fig. 1 gives a diagram of the ensemble of the equipment showing the principle of transmitters.

Fig. 2 shows the position of rest of a transmitter designed for generating a measuring current proportional to the angular displacement of a directing member.

Fig. 3 shows the same transmitter whose members are occupying another position.

Fig. 4 gives a curve indication the variations of the measuring current in function of the angular displacement of the directing member.

Fig. 5 shows a transmitter designed for the remote indication of the rectilinear displacements of small amplitude of a manometer of the flexible membrane type.

Figs. 6 and 7 show the extreme positions of the electromagnetic members of the transmitter shown on Fig. 5.

Fig. 8 shows a transmitter designed for the remote indication of rectilinear displacements of comparatively high amplitude.

Fig. 9 shows the same transmitter with its members occupying another position.

Fig. 10 show a manometer of the metallic bellows type combined with a transmitter of the type shown on Fig. 9.

According to the above drawings the equipment the transmitter of which forms the object of the present invention is shown diagrammatically in its ensemble by Fig. 1. In this figure the source of electrical supply is constituted by a multipolar alternator A driven by a D. C. motor M, whose speed is perfectly adjusted by means of a regulator $V_1$ of a known type. This motor is operated from the D. C. supply, the said supply comprising a storage battery B. The alternator is provided with a voltage regulator R of a known type which keeps the voltage U constant or approximately so across wires $f_1$ and $f_2$. Three transmitters $T_1$, $T_2$, $T_3$ have been shown only but a much larger number can be used. Each of those transformers comprises a primary winding 1 connected to wires $f_1$ and $f_2$, a secondary winding 2 connected to the control panel board C and a magnetic circuit made of ferromagnetic material with a movable part 3, windings 1 and 2 being stationary. The moving magnetic part 3 can displace itself very freely under the action of a directing member such as a manometric tube 4, which by way of example has been shown only once.

This transformer is designed in such a way that for an extreme position of the directing member 4 there is no magnetic flux linking with the secondary winding 2. The indicating voltmeter $V_2$, which measures the induced voltage is then at zero. When member 3 is moving an increasing part of the magnetic flux generated by the primary winding 1 is linking with the secondary 2 and causes a deflection on the indicating voltmeter. The transformer must be made in such a way that the magnetic leakage be approximately null when the directing member 4 reaches the end of its stroke. The following figures on the drawing will show more clearly how this result is obtained.

Assuming the installation to include N transformers such as T, and N indicating voltmeters such as V, the control panel board C will be connected to the various transmitters by N special wires and one common return wire; the cable will therefore include $(N+1)$ wires only while the transmitting systems used at present (autosyn) require a much larger number of conductors.

For ensuring the control and good supply of the transformers a measuring instrument E is fitted on panel board C, the said instrument giving the value of the primary voltage $U_1$. This instrument can put in action an alarm signalling device, signalling any accidental disturbance such as a variation in the current intensity or in the frequency of the primary currents supplied to the transmitters.

For applying the invention in the best conditions, very rugged transformers should be used which do not require any inspection for maintenance. This result is easily obtained since windings are stationary and can be perfectly insulated; furthermore the movable part is mechanically simple and several means can permit reduction of friction and risk of wedging to a minimum. It should be also noted that motion does not take place very frequently, the average speed being small.

Figs. 2 and 3 are showing details of a first embodiment of a transformer which is particularly suitable when the motion of the directing member is converted into an alternating rotation with a small amplitude. In certain cases such a motion can be obtained by means of a direct transmission or by means of a transmission with a very simple mechanism such as a reducing or multiplying gear, crank and rod (5, 6 on Fig. 1), cam 7, lever 8 (Fig. 2). To avail one's self of a larger driving power there is advantage in reducing the speed of the motion of the directing member; accordingly the transformer has been designed for obtaining comparatively large measuring currents by means of small displacements.

The transformer shown on Fig. 2 includes a laminated magnetic circuit with magnetic ferrous sheets of high permeability causing only low hysteretic losses and eddy currents. The stationary part of this magnetic circuit constitutes a bipolar stator 9 and 10 energized by a coil 1 constituting the primary circuit shown diagrammatically on Fig. 1. The said coil 1 is fitted on a core 10 having a small sectional area so that the primary flux varies always between fixed values determined by the magnetic saturation of the core even when the primary alternating current $i_1$ undergoes small accidental variations. The pole pieces 9, 10 are arranged to have two transverse planes of symmetry, the one XX' passing through the air gaps symmetrically between the said pole pieces, and the other YY' being perpendicular to XX'.

A magnetic piece 11 with a double T shape is fitted between poles 9 and 10 of the stator. The said piece rotates about the central axis O. It is provided with two polar extended pieces bounded by cylindrical surfaces adjacent to the stator poles. The polar pieces opposing one another have the shape indicated on Fig. 2 and it can be seen that air gaps such as $e_1$ and $e_2$ are formed. Around the movable piece 11 a secondary winding is provided which reproduces the measuring electric current. The said winding is constituted by two hollow coils having their common axis lying in the plane XX' and arranged on either side of axis O which permits the free passage of this axis connected to the directing members. The diameter of the holes and the length of coils as well as the shape of the coils are selected so that piece 11 can turn freely without rubbing against any other piece than the bearings of the said axis between the positions shown on Figs. 2 and 3.

It can be seen that during this rotation the reluctance of air gap $e_1$ and that of the similar air gap diametrically opposite are decreasing; on the contrary the reluctance of air gap $e_2$ and that of the similar air gap diametrically opposite are increasing. For the initial position of the directing member, the movable piece 11 occupies the position shown on Fig. 2. That piece 11 is directed along a neutral position, i. e. the plane bisecting its poles coincides with the symmetry plane XX' passing between the pole pieces 9, 10 of the stationary magnet. For that position the four air gaps such as $e_1$ and $e_2$ are equal and the magnetic flux developed by the primary winding 1 passes through the polar extensions of pieces 11 on either side of the secondary winding as indicated by dotted lines. Accordingly the flux linking with the turns of coil 2 is zero and no E. M. F. is induced in the secondary circuit.

The secondary winding 2 is connected to a voltmeter V of the moving coil type, the said coil moving in the field of a permanent magnet, through a thermal compensation resistance 12 and a rectifier 13 of the dry type. The peculiar points of a known design are embodied so that voltmeter V measures the mean rectified current $i_m$ which flows through the secondary circuit while compensating at the same time the influence of temperature variations.

When movable piece 11 occupies the extreme position shown in Fig. 3 the flux passes mainly through air gap $e_1$ and that diametrically opposite; magnetic leakage becomes very small and it can be seen that most of the whole of the flux generated by the primary circuit is linking with the secondary winding 2. Furthermore the intensity of this flux is very high for the magnetic circuit is well closed and constituted largely by pieces with a high permeability. A comparatively high measuring current with respect to the consumption of the voltmeters of the usual polarized type can thus be developed by induction.

When piece 11 displaces itself between the position shown in Fig. 2 and that shown on Fig. 3 under the action of the directing member, the intensity of the measuring current $i_m$ flowing through voltmeter V varies continuously as shown on the curve of Fig. 4. The said curve is obtained by taking the values of $i_m$ as ordinates and the values of angle $a$ as abscissae (Fig. 3), $a$ being the angle of rotation of 11 with respect to the neutral position (Fig. 2). Experience shows that it is possible to adapt polar shapes so that between $a=O$ (Fig. 1) and $a=a_2$ current $I_m$ increases proportionally to angle $a$. The proportion and shapes of poles giving this result are those represented on Figs. 1 and 2. If deemed useful one can differ from those proportions still obtaining a shape of curve as shown on Fig. 4. On parts of the said curve such as $Oa_1$ and $a_2a_3i_m$ does not increase linearly which may permit to alter the variation of $i_m$ in function of the angle of inclination $a$ and in function of the displacement of the directing member as may be desired. The said law can also be modified by interposing an appropriate mechanism between the directing member and axis O, for instance a cam 7 and lever 8 (Fig. 2); it is thus possible to obtain an indicating voltmeter with a divided scale indicating the displacements of the directing member, the divisions being equally or unequally spaced.

Experience shows that it is possible to give polar pieces special shapes permitting piece 11 to rotate perfectly freely without being subjected to a torque due to magnetic attraction. This result can be explained through the fact that when piece 11 rotates in the direction of the arrow $f$ the reluctance of air gap $e_2$ decreases while that of air gap $e_1$ is increasing; accordingly, the magnetic piece is subjected to two torques in opposite directions which tend to counterbalance one another and it is possible to determine the shapes which permit cancelling absolutely the resulting torque for all positions taken by piece 11. Shapes which fulfill that condition are shown for example on Figs. 2 and 3. The active parts of the stator poles are cylindrical surfaces concentric to axis O, while the poles of pieces 11 are limited by cylindrical surfaces which are slightly eccentric with respect to O.

When these special forms are adapted the transmitting instrument exerts no influence on the motion of the directing member. The torque required to generate the measuring current may be reduced to an extremely small value and is not prejudicial to the accuracy of the measurement when the directing member is a very sensitive instrument putting in action but very small forces.

Fig. 5 shows a type of transmitter which is combined with advantage with directing members having a small rectilinear displacement, such as for instance capsules and flexible diaphragms of manometers. The magnetic circuit of the transformer is constituted by a flat case made of iron or of another appropriate material with a high magnetic permeability and causing but low hysteretic and eddy current losses. The said box consists of a cylindrical envelope 14 and two washers 15 and 16 of magnetic metal. Another washer 17 made of magnetic material is fitted inside the box and constitutes a partition located approximately at equal distances from the opened bottom 16 and the opened cover 15. The distance between bottom 16 and partition 17 can also be reduced and cover 15 can be fitted with a tubular recessing part 18 as shown on Fig. 5. Two annular empty spaces of small thickness are provided between pieces 16, 17, 18, as shown on the said figure. The diameters of the holes in pieces 16, 17, 18 are equal. A plunger core made of high grade magnetic material 19 which is linked to the movable member of which the displacements are to be measured penetrates into the center of the box and is very freely displaced therein with a small alternating motion between the two extreme positions shown on Figs. 6 and 7. The primary winding is constituted by the hollow coil 1 fitted between pieces 15 and 17; the secondary winding is constituted by a coil 2 fitted between pieces 16 and 17, as shown on Fig. 5. The movable core 19 passes freely through those windings and is displaced along the axis common to the coils and the circular pieces 16, 17, 18. The magnetic core 19 consists of a rod carrying at its extremities two cylindrical bosses whose diameter is slightly smaller than that of the holes in pieces 16, 17 and 18. The distance between the bosses of the core is slightly larger than that between pieces 16 and 17. Core 19 may be fixed for instance on the center of the flexible membrane of a manometric capsule 20.

The primary coil 1 receives an alternating current with constant voltage and frequency and coil 2 is connected to a measuring voltmeter. The dial of that instrument is marked with divisions according to the positions occupied by core 19 and corresponding values of pressures to be indicated at a distance, those pressures being measured by monometer 20.

The device shown on Fig. 5 operates like the transformer shown on Fig. 2. When the core occupies its initial position shown on Fig. 6 the flux developed by the primary winding 1 is closed directly on itself since the upper boss on core 19 lies opposite the stationary magnetic pieces 18, 17. The leakage flux which links with winding 2 is very small and negligible for the air gap is very large, the lower part of core 19 being drawn away from bottom 16.

When the core occupies the other extreme position as shown on Fig. 7, the flux is linking at the same time with windings 1 and 2 and leakage is much reduced. In fact the core makes pieces 15, 18 and 16 communicate magnetically through gaps with a very small reluctance. It can be seen that the magnetic flux is led through a circuit consisting for the major part of pieces with a high permeability. Accordingly the voltage induced in winding 2 reaches a high value. The measuring current $i_m$ is comparatively high.

For positions intermediate between those shown on Figs. 6 and 7, the measuring current increases gradually according to a curve similar to the curve of Fig. 4, on which abscissae $a$ would represent the linear displacements of the core. It is possible to select sizes of poles and strokes so as to obtain a determined law for the variation of current $i_m$ in function of the quantity to be indicated. One can take advantage of the shape of the curve of Fig. 4 to render the deflections of the pointer strictly proportional to the said quantity. For instance if volume 20 is constituted by the empty capsule of an altimeter, one knows that the sag corresponding to the deformation of the said capsule varies with altitude in accordance with a complex law. One can take advantage of the behavior of the curve of Fig. 4 to obtain that the indicating voltmeter marked with altitude divisions be provided with a scale with equally distant divisions. It will be noted that the device shown on Fig. 5 operates without any friction; the stroke of core 19 can be very small, for instance 0.02 to 0.5 cm.

Naturally one can depart from the methods of construction which have just been described in detail without departing from the scope of the present invention. By way of example a device of transformer-transmitter has been shown on Figs. 8 and 9 which is particularly adapted to the remote indication of linear displacements which are comparatively great (stroke of the order of 0.3 to 2 cm.)

As for the previously described transmitter the stationary magnetic circuit consists of a case comprising an outer tube 25 and washers 22, 23 and 24; a magnetic core 25 is moving freely inside that box between positions shown in Figs. 8 and 9. Two coils 26 and 27 are fixed between cover 24 and median partition 23 and two coils 28 and 29 are also fixed between partition 23 and bottom 22.

The primary winding consists of coils 27 and 28 adjacent to the median washer 23; these coils are connected in series but the directions of their windings are reversed. These coils are supplied by the constant alternating voltage U (Fig. 1). Coils 26 and 29 connected in opposition are connected to the indicating voltmeter V.

The shape of core 25 is that of a long cylinder whose diameter is slightly smaller than that of the holes in coils and pieces 22, 23 and 24. A length equal to or larger than the distance between pieces 22 and 23 is given the said core which can be provided with truncated conical extensions as shown on Fig. 8.

This device operates as follows:

When the core occupies position shown in Fig. 8 the measuring current is zero for the E. M. F.'s induced in coils 27, 28 are equal and in opposition. When the core is approaching the extreme position indicated on Fig. 9, coupling between coils 28, 29 becomes more and more consequent for the reluctance of the magnetic circuit common to those coils decreases more and more. A predominating voltage is induced in coil 29 and causes the deflection of voltmeter V. That deflection reaches its maximum value when the core occupies the position shown on Fig. 9 as it connects magnetically pieces 22 and 23 and the flux linking with coil 29 reaches a very high density.

In the devices shown on Figs. 5 and 8 the primary current exerts on the moving core a small attractive force. Experience shows that that force is not troublesome for it is small and furthermore it is constant for the various positions occupied by the core. It is therefore possible to calibrate the transmitting device by marking on the voltmeter divisions the corresponding quantities of which determine the motion of the directing member. The measuring system is sensitive and faithful on account of the fact that friction is very small and that the primary winding receives a current at constant frequency and voltage.

The magnetic circuits of the devices shown on Figs. 2 and 8 can be constituted of appropriate materials such as iron-silicon alloy. The saturation of the primary magnetic circuit can be obtained in using known alloys such as iron-nickel. One can also use magnetic circuits constituted with compressed granular powder made out of magnetic material, the grains being isolated by an insulating product which permits avoiding eddy currents.

Fig. 10 shows the application of the transformer shown on Fig. 5 to an embodiment of a manometer whose sensitive member is a flexible magnetic bellow 30 subjected to the action of helical spring 31.

The transformer with variable leakage constitutes an interchangeable element of the instrument. To this end it is fitted with non magnetic pieces 33, 34 which ensure the guiding of the movable core 19.

The instrument shown on Fig. 10 can be used for gaging a liquid by measuring the weight of a column of liquid located above bellow 30. The windings can be enclosed in a liquid proof casing fitted below the container. It may be useful to make the inner volume capacity of the bellow communicate with the higher empty part of the container. To this effect a communicating tube 35 may be provided.

The instrument operates as follows:

The pull exerted above the liquid-proof bellow downward displaces the plunger 19 and causes the measuring current to vary, the said current in winding 2 being due to induction.

What I claim is:

1. A variable transformer, particularly for remote measurements of the displacements of a movable member, comprising a laminated magnetic circuit consisting on one hand of a stator provided with two cylindrical and symmetrically arranged concave polar pieces and with two air-gaps arranged between said polar pieces and a fixed primary winding arranged on said stator, and on the other hand of a double T-shaped rotor with rounded ends arranged to rotate between said polar pieces of the stator, a fixed secondary winding arranged between said polar pieces of the stator and surrounding the rotor with a certain amount of play so that the latter is allowed to rotate with a small amplitude, the said secondary winding having its axis in the plane passing symmetrically between the fixed polar pieces, the said rotor being linked to the movable member of which the displacements are to be measured so that at the position of rest of the latter, the plane of symmetry of the rotor takes a position perpendicular to the plane passing symmetrically between the polar pieces of the stator and through the axis of the fixed secondary winding.

2. A variable transformer, particularly for remote measurements of the displacements of a movable member, comprising a laminated magnetic circuit consisting on one hand of a stator provided with two cylindrical and symmetrically arranged concave polar pieces and of a fixed primary winding arranged on said stator, and on the other hand of a double T-shaped rotor with rounded ends arranged to rotate between said polar pieces of the stator, a fixed secondary winding arranged between said polar pieces of the stator and surrounding the rotor with a certain amount of play so that the latter is allowed to rotate with a small amplitude, the said secondary winding having its axis in the plane passing symmetrically between the fixed polar pieces, the said rotor being linked to the movable member of which the displacements are to be measured so that at the position of rest of the latter, the plane of symmetry of the rotor takes a position perpendicular to the plane passing symmetrically between the polar pieces of the stator and through the axis of the fixed secondary winding, the concave polar pieces of the stator and the rounded ends of the double T-shaped rotor being shaped so that the total reluctance of the magnetic circuit remains substantially constant during the displacements of the rotor.

3. A variable transformer, particularly for remote measurements of the displacements of a movable member, comprising a magnetic circuit formed on one hand by a fixed part provided with two polar pieces arranged to form two air gaps and having two transverse planes of symmetry, the one passing symmetrically between the polar pieces, and the other being perpendicular to the first one, a magnetic piece connecting said polar pieces, and a stationary primary winding arranged on said connecting piece to generate an electromagnetic flux between said pole pieces, and on the other hand by a movable magnetic part controlled by the movable member of which the displacements are to be measured, and by a stationary secondary winding surrounding the movable magnetic part and having its axis arranged in the plane passing symmetrically between the pole pieces of the fixed magnetic part, said movable magnetic part being linked to the member of which the displacements are to be measured in such a manner that when said displacement is nil, said movable magnetic part is symmetrically positioned with respect to the said secondary winding and to the two air gaps.

4. A variable transformer according to claim 3, in which the primary and secondary windings comprise hollow and coaxially arranged primary and secondary coils, in which the fixed part of the magnetic circuit comprises longitudinal elements arranged outside said coils and of transverse elements comprising a central member forming a partition separating said coaxially arranged coils and two outer members adjacent to the outer faces of the extreme windings respectively, whereby a double magnetic circuit is formed, said transverse members being provided with a central aperture, and in which the movable magnetic part comprises a plunger arranged to be displaceable inside said coils along their axis and so linked to the movable member of which the displacements are to be measured that for the position of rest of said movable member the voltage induced in the secondary coils is substantially nil, and that for its maximum displacement at least one half of a primary coil is coupled with at least one half of a secondary coil by said plunger.

5. A variable transformer according to claim 3, in which the primary and secondary windings comprise two hollow coaxially arranged coils, and secondary winding respectively, in which the fixed part of the magnetic circuit is made of material of high permeability and comprises longitudinal elements arranged outside said windings and transverse elements comprising a central member forming a partition separating said coaxially arranged coils, and two outer members adjacent to the outer faces of the extreme windings respectively, whereby a double magnetic circuit is formed, said transverse members being provided with a central aperture, and in which the movable magnetic part comprises a plunger arranged to be displaceable inside said coils along their axis and so linked to the movable member of which the displacements are to be measured that for the position of rest of said movable member the voltage induced in the secondary coil is substantially nil, and that for its maximum displacement at least one half of the primary coil is coupled with at least one half of the secondary coil by said plunger.

6. A variable transformer according to claim 3, in which the primary and secondary windings comprise four hollow super-imposed and coaxially arranged windings, in which the fixed part of the magnetic circuit is made of a material of high permeability and comprises longitudinal elements arranged outside said windings and transverse elements comprising a central member forming a partition separating said windings into two pairs of windings and two outer members adjacent to the lower and to the higher winding respectively, said transverse members being each provided with a central aperture, one of the windings of each pair located either side of the central partition serving as a primary winding and the other as a secondary winding, and in which the movable magnetic part comprises a magnetic plunger arranged to be displaceable inside said windings along their axis and so linked to the movable member of which the displacements are to be measured, that for the position of rest of said movable member the voltage induced in the secondary coils is substantially nil and that for its maximum displacement, at least one half of a primary coil is coupled with at least one half of a secondary coil by said plunger.

7. A variable transformer according to claim 3, in which the fixed part of the magnetic circuit has the form of a cylindrical box made of a material of high permeability and of which the cover and the bottom are provided with a central aperture so as to form annular magnetic shanks, and a central annular shank of magnetic material disposed between said top and bottom, in which the primary and secondary windings comprise primary and secondary coils coaxially arranged in said box, said central shank separating said coils in two symmetric groups, whereby a double magnetic circuit is formed, and in which the movable magnetic part comprises a plunger arranged to be displaceable inside said coils along their axis and so linked to the movable member of which the displacements are to be measured that for the position of rest of said movable member the voltage induced in the secondary coil is substantially nil, and that for its maximum displacement at least one half of a primary coil is coupled with at least one half of a secondary coil by said plunger.

8. A variable transformer according to claim 3, in which the fixed part of the magnetic circuit comprises a cylindrical box made of a material of high permeability and having a cover and bottom each provided with a central aperture, so as to form outer annular magnetic shanks, and a central annular shank of magnetic material forming a partition in said box, in which the primary and secondary windings comprise two hollow coils coaxially arranged within said box, one serving as the primary coil and the other as the secondary coil, said coils being separated by said partition whereby a double magnetic circuit is formed and in which the movable magnetic part comprises a rod of magnetic material displaceable within said hollow coils and provided at both ends with cylindrical bosses the diameter of which is slightly less than the inner diameter of the coils, one of said bosses having a thickness greater than the other and the distance therebetween being greater than the distance between the shanks of the secondary coil, the said movable rod being linked to the member of which the displacements have to be measured so that at rest the thicker boss of the movable rod faces the outer magnetic shank adjacent to the primary coil and the central magnetic shank, whereas for the maximum displacement of the rod said bosses face both outer magnetic shanks respectively.

9. A variable transformer according to claim 3 in which the fixed part of the magnetic circuit comprises a cylindrical box made of material of high permeability and having a cover and bottom each provided with a central aperture so as to form annular shanks, and a central annular magnetic shank disposed between the cover and bottom, in which the primary and secondary windings comprise four hollow coils coaxially arranged within said box, said central shank forming a partition between and separating said four coils in two symmetrical pairs, and in which the movable magnetic part comprises a magnetic plunger having a length less than the overall length of the four windings and the diameter of which is slightly less than the inner diameter of said coils, said plunger being arranged to be displaceable inside said coils along their axis and being linked to the movable member of which the displacements are to be measured, one of the coils of each pair located on either side of the central partition serving as a primary coil and the other as a secondary coil, both said secondary coils being connected in series so that the voltages induced therein due to the primary coils have opposite direction and exactly compensate one another for the position of rest of the movable member.

MARIUS JEAN LAVET.

REFERENCES CITED

The following references are of record in the file of this patent:

UNITED STATES PATENTS

| Number | Name | Date |
|---|---|---|
| 691,742 | Le Blanc | Jan. 28, 1902 |
| 705,482 | Thiermann | July 22, 1902 |
| 1,431,627 | Bristol | Oct. 10, 1922 |
| 1,668,457 | Kath | May 1, 1928 |
| 1,897,415 | Barbour | Feb. 14, 1933 |
| 1,943,463 | Von Ohlsen et al. | Jan. 16, 1934 |
| 1,964,265 | Markley | June 26, 1934 |
| 2,068,116 | Shotter | Jan. 19, 1937 |
| 2,139,385 | Schwarze et al. | Dec. 6, 1938 |
| 2,334,543 | Connolly | Nov. 16, 1943 |
| 2,427,866 | MacGeorge | Sept. 23, 1947 |